United States Patent [19]
Earle

[11] Patent Number: 5,515,676
[45] Date of Patent: May 14, 1996

[54] VACUUM PUMP MOTOR CONTROL APPARATUS AND METHOD OF OPERATION THEREOF

[75] Inventor: Stephen R. Earle, Leeds, Great Britain

[73] Assignee: WABCO Automotive UK Limited, Rugby, United Kingdom

[21] Appl. No.: 244,974

[22] PCT Filed: Dec. 17, 1992

[86] PCT No.: PCT/GB92/02346

§ 371 Date: Jun. 17, 1994

§ 102(e) Date: Jun. 17, 1994

[87] PCT Pub. No.: WO93/11983

PCT Pub. Date: Jun. 24, 1994

[30] Foreign Application Priority Data

Dec. 18, 1991 [GB] United Kingdom ............... 9126800
Jun. 27, 1992 [GB] United Kingdom ............... 9213709

[51] Int. Cl.$^6$ .................... F16D 31/02; F04B 49/00
[52] U.S. Cl. .................... 60/410; 60/411; 60/412; 417/12; 417/44.2
[58] Field of Search ............... 60/327, 394, 407, 60/409, 410, 411, 412, 397; 417/12, 17, 44.2

[56] References Cited

U.S. PATENT DOCUMENTS

| | | | |
|---|---|---|---|
| 1,786,114 | 12/1930 | Hughes | 417/12 |
| 3,814,542 | 6/1974 | Iglesias et al. | 417/12 |
| 4,024,709 | 5/1977 | Erdmann | 70/397 |
| 4,135,860 | 1/1979 | van Nederkassel | 417/12 |
| 4,178,756 | 12/1979 | Adachi et al. | |
| 4,201,517 | 5/1980 | Ferguson | 417/12 |
| 4,207,031 | 6/1980 | Maskrey et al. | 417/12 |
| 4,412,416 | 11/1983 | Van House | 60/412 X |
| 4,510,425 | 4/1985 | Yokota et al. | 417/44.2 X |
| 4,518,316 | 5/1985 | Yokota | 417/12 |
| 4,738,112 | 4/1988 | Nomura et al. | 60/327 X |
| 4,807,616 | 2/1989 | Adahan | 417/44 X |
| 4,889,002 | 12/1989 | Abraham | 74/89.15 |
| 5,123,081 | 6/1992 | Bachman et al. | 388/934 |

FOREIGN PATENT DOCUMENTS

| | | |
|---|---|---|
| 2505880 | 8/1976 | Germany. |
| 2814384 | 10/1979 | Germany. |
| 2924222 | 12/1980 | Germany. |
| 3238882 | 4/1984 | Germany. |
| 3322176 | 1/1985 | Germany. |

*Primary Examiner*—John E. Ryznic
*Attorney, Agent, or Firm*—Stroock & Stroock & Lavan

[57] ABSTRACT

An apparatus and method for controlling an electrically driven vacuum pump (16) for a motor vehicle provides that below a predetermined level of vacuum (approaching atmospheric pressure) the pump (16) runs at a first speed, and above that level of vacuum the pump (16) runs at a lower speed or is stopped. Pump control is by switching of a single pressure switch (21) between two states, switching from the first state to the second state being accompanied by a time delay to ensure a minimum running period at the first speed.

11 Claims, 3 Drawing Sheets

VACUUM PUMP MOTOR CONTROL APPARATUS AND METHOD OF OPERATION THEREOF

This application is a Rule 371 of PCT/GB92/02346 filed Dec. 17, 1992.

This invention relates to vacuum pump motor control apparatus and particularly to apparatus for controlling an electrically driven vacuum pump of a motor vehicle. The invention also relates to a method of controlling an electrically driven vacuum pump.

For many years the partial vacuum created in the inlet manifold of a petrol engine has been utilized to exhaust the reservoir of a vacuum brake servo, thereby to provide power assistance for the vehicle brakes. Such a system is simple and extremely reliable.

The vacuum available from the inlet manifold of a petrol engine may however be insufficient to meet brake servo demand in certain conditions of use. Furthermore the vacuum source may also be required for operation of other devices such as exhaust gas recirculation (EGR) valves.

Diesel engines have an unthrottled air supply and thus the partial vacuum in the inlet manifold is only marginally below atmospheric pressure; consequently a useful vacuum source is not available. Accordingly mechanically operated vacuum pumps have been proposed for cars and light trucks equipped with a conventional vacuum brake servo. Such pumps are typically driven from the engine camshaft by for example a follower or a belt.

Vacuum pumps are not required for medium and heavy weight trucks because these vehicles are usually equipped with spring brakes actuated by a high pressure pneumatic control system.

The space available under the bonnet of a car or light truck is usually limited, and the installation of a vacuum pump can cause difficulties if the vehicle design has been optimised for a petrol engined variant. In any event, the difficulty of installing an engine driven pump is exacerbated by the use of overhead camshaft engines because the pump mounting may tend to increase the vehicle bonnet height and reduce access to other parts of the engine. It may also be difficult to arrange adequate lubrication for a mechanically driven pump mounted at the top of an engine.

Electrically driven vacuum pumps are suitable for installation in any convenient space in the engine compartment, and may advantageously be located in an area not subject to extremes of temperature cycling.

Electrically driven vacuum pumps may be used to meet the entire vacuum demand or, in conjunction with the vacuum available from the inlet manifold of a petrol engine, to meet peak demands only.

One problem with conventional vacuum pumps is that they are usually designed to work continuously throughout the speed range of the engine, their performance must thus be specified for the minimum engine speed and thus such pumps take a significant amount of energy to run at higher speeds; this results in an unnecessary increase in vehicle fuel consumption, especially where on a motorway journey of several hundred miles the vehicle driver may only use the brakes once or twice and other vacuum demands are low.

Hitherto vacuum pumps for vehicle installations have been designed for continuous operation and are thus over-specified for the actual service duty. Typically a vacuum pump needs to operate for around 10 seconds in order to exhaust a brake servo reservoir and, as noted above, the pump may be required to operate very infrequently.

According to one aspect of the invention there is provided vacuum pump control apparatus for an electrically driven vacuum pump, the apparatus comprising a pressure switch for indicating a predetermined level of vacuum in a reservoir, said switch having two states, and control means responsive to a first state of said switch indicative of vacuum below said predetermined level to cause the electrical drive of said pump to run at a given speed, and responsive to a second state of said switch indicative of vacuum above said predetermined level to cause said electrical drive to run at a lower speed than said given speed or to stop, said control means further including delay means operable to delay slowing or stopping of said electrical drive in response to said second state of said switch.

Such apparatus obviates the need for a second pressure switch in the vacuum reservoir to indicate the level of vacuum at which the pump should cease to operate at the given speed. The control apparatus causes the electrical drive to operate at a high speed and a low speed, or causes the electrical drive to operate at a given speed when vacuum is insufficient and stop when vacuum is above a desired level. The pump may be stopped by de-energising the electrical pump drive.

Preferably in a vehicle installation the switch changes state on a falling level of vacuum at about 65 kPa, and on a rising level of vacuum at about 70 kPa, the difference being a result of inherent hysteresis in the switch. In the preferred embodiment the delay means ensures that the pump continues to run at the higher speed for 2–5 and preferably 3–4 seconds before stopping or slowing to a lower speed.

In one preferred embodiment said control means includes timing means operable to de-energise said pump at a predetermined period after response to a first state of said switch, no further change in state of said switch having occurred during said predetermined period.

In another preferred embodiment said control means is responsive to means for sensing the temperature of the pump and/or the electrical drive, and operable to de-energise said electrical drive in the event that a predetermined temperature is reached.

In yet another preferred embodiment the control means may include warning means to indicate that the pump had exceeded predetermined operational limits, and that de-energisation could consequently occur. For example a warning light may appear on the vehicle dashboard if the pump has run for a period which might otherwise result in de-energisation, the pump being permitted to run until some other operational parameter, such as excessive temperature, causes the pump to be de-energised.

The timing means and/or temperature sensing means ensures that the vacuum pump is not damaged by continuous running at the higher speed as a result of a vacuum leak or a fault in the vacuum switch circuit, e.g. a disconnected wire. In the event of a leak the pump would serve no useful purpose by running and de-energisation of the pump electrical drive is therefore desirable to avoid overheating of the pump and possible fire. If a fault occurred in the vacuum switch circuit the vehicle would be safe to drive but it would also be desirable to de-energise the pump.

In a vehicle installation de-energisation of the electrical drive preferably occurs after about 90 seconds and/or on sensing a pump operating temperature of above 150° C.

In the preferred embodiment, de-energisation of said pump would result in a warning symbol being displayed on the vehicle dashboard thus giving an indication that power assistance for the brakes may no longer be available. In all probability however, the vehicle driver would become aware that vacuum assistance had failed before the warning symbol was displayed.

Preferably the timing means is re-set on turning the vehicle ignition off and on. The temperature sensing means will preferably automatically reset on a reduction in temperature being sensed. This would give the vehicle driver an opportunity to repair the system, for example by vacuum hose or wire replacement, and continue his journey with full vacuum assistance to the brakes.

The invention also provides a method of operating an electrically driven vacuum pump said method comprising the steps of:

causing said pump to run at a first speed in response to vacuum falling below a first predetermined level, and causing said pump to run at a lower speed or to stop in response to vacuum rising above a second predetermined level at a predetermined delay after said second predetermined level has been reached, said first predetermined level being closer to atmospheric pressure than said second predetermined level.

Said first and second predetermined levels are preferably separated by a small amount equivalent to the hysteresis in a pressure sensing switch.

The method may include the additional step of de-energising the electrical pump drive at a predetermined period after energisation thereof in the event that the level of vacuum has not risen to said second predetermined level.

The method may further include the step of de-energising the electrical drive of said pump in the event that temperature of said pump exceeds a predetermined level.

Other features of the invention will be apparent from the following description of a preferred embodiment described by way of example only and with reference to the accompanying drawings in which.

Figure 1:
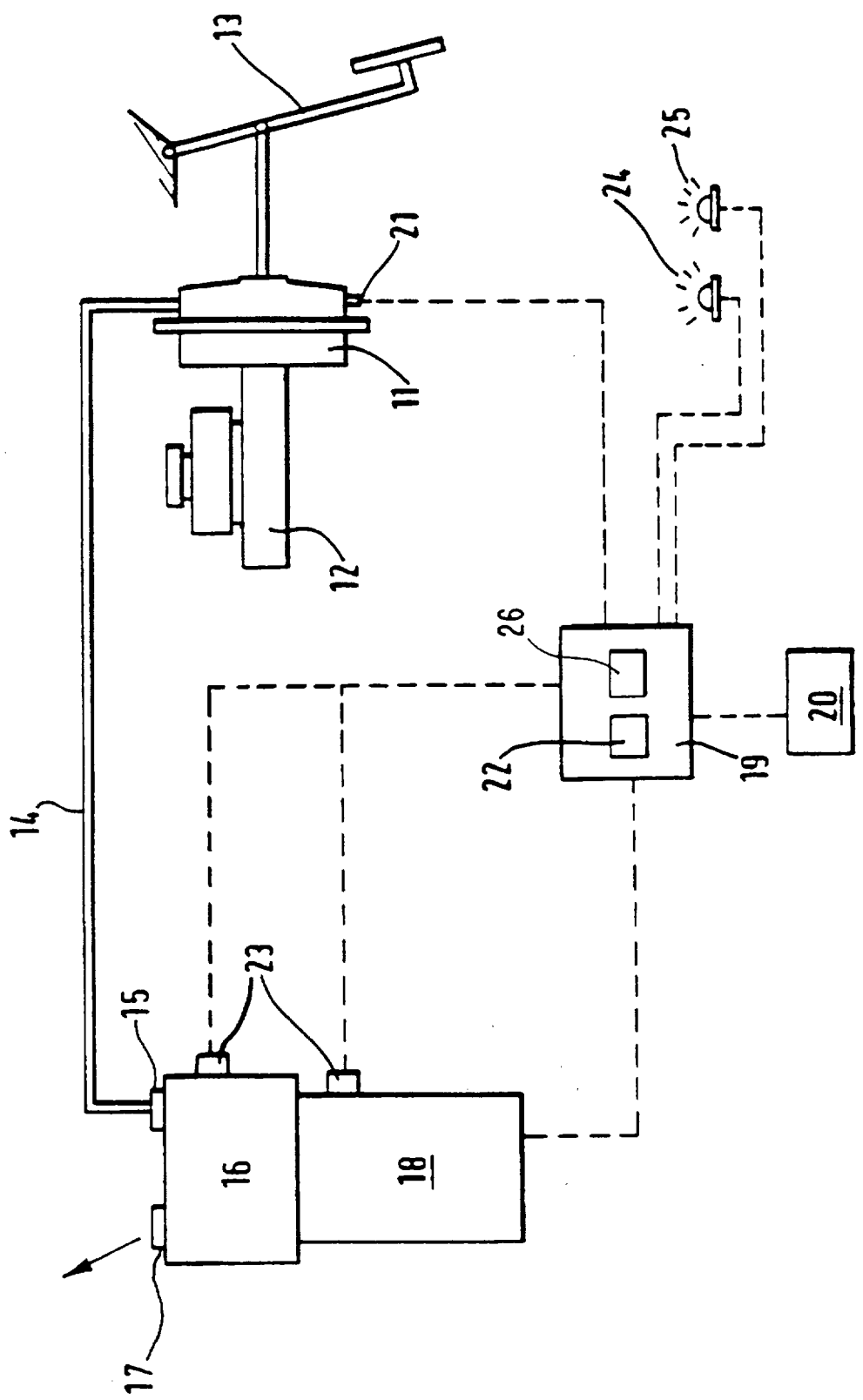
FIG. 1 is a schematic illustration of a vehicle brake installation incorporating the invention.
Figure 2:
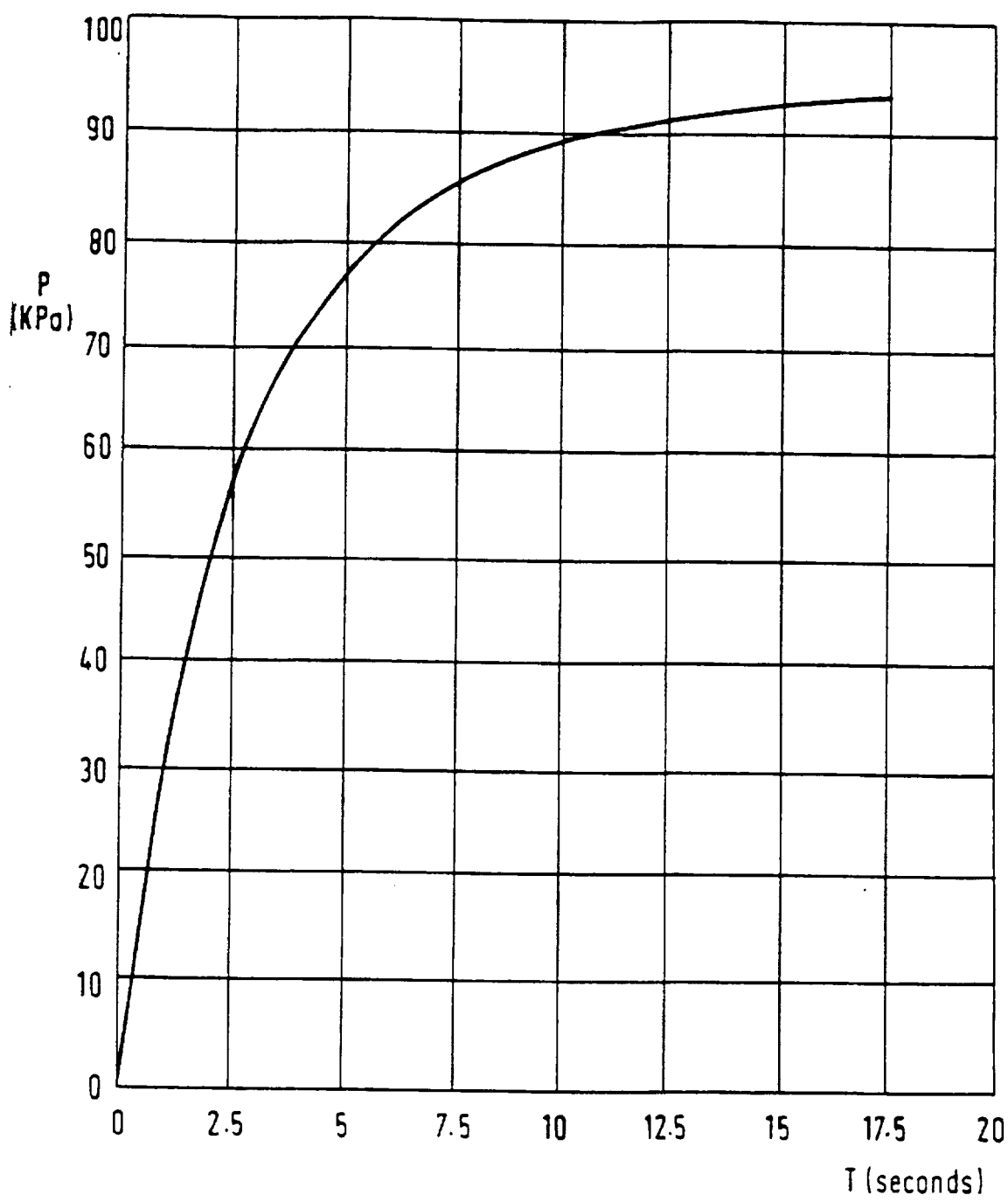
FIG. 2 is a typical performance curve for an electrically driven vacuum pump.

FIG. 1 illustrates a vehicle brake servo 11 having the usual master cylinder 12 and brake pedal 13. A vacuum line 14 connects the servo 11 to the inlet port 15 of an electrically driven vacuum pump 16; the pump 16 has an exhaust port 17.

The pump 16 is typically a reciprocating piston pump, vane pump or diaphragm pump driven by an electric motor 18; the motor and pump piston are connected by an eccentric journal and connecting rod (not shown) or in any other conventional manner.

An electronic control unit 19 controls operation of motor 18 in accordance with signals received from a pressure switch 21 located in the pump or on the low pressure side of the servo 11. The power source for the motor 18 is typically a vehicle battery or generator 20.

In a first embodiment the pump has two speeds and runs continuously at low speed whenever the vehicle ignition is on; at low speed the pump is rated to meet continuous vacuum demands, such as those imposed by an EGR valve. Low speed pump running occurs when the pressure switch 21 indicates that the vacuum reserve is sufficient.

The control unit causes the pump speed, and thus output, to increase in response to an insufficient vacuum reserve indicated by a change in state of switch 21. The pump is thus able to meet peak demands, such as those imposed by a brake booster.

In a second embodiment useful where continuous demands are negligible or non-existent, the pump may be de-energised until vacuum falls below a predetermined level (typically −65 kPa gauge, approaching atmospheric pressure). The pump is energised to meet intermittent demands, such as those imposed by a brake booster.

Operation of the control unit in the first embodiment is as follows and assumes an initial condition with the brake booster vacuum reservoir exhausted to the desired level.

Actuation of the brake pedal 13 depletes the level of vacuum in servo 11. If a single or repeated application depletes vacuum to about −65 kPa the pressure switch 21 changes state thus indicating a low level of vacuum to the control unit 19. The motor 18 is immediately caused to run at high speed and the pump 16 begins exhausting the low pressure side of the servo 11.

In practice the pump will probably commence pumping at a pressure rather closer to atmospheric than that at which the switch 21 changes state. This is simply because the level of vacuum is unlikely to stop falling at precisely the point at which the switch 21 responds.

The pressure switch 21, like all similar devices, exhibits a small amount of hysteresis which results in a second change of state at about −70 kPa as the level of vacuum increases. This hysteresis ensures that the pump will run at high speed for a minimum period.

The control unit includes a delay 22 to ensure that the motor 18 continues to run at high speed for a predetermined period, typically 3–4 seconds, beyond the point at which the switch changes state. This ensures that the reservoir is exhausted to a satisfactory level, typically −80 kPa without requiring a second pressure switch to indicate a desired level of vacuum. After the predetermined period has passed, the control unit causes the pump to revert to low speed running.

The level of vacuum at which switch changes state may be set to suit particular circumstances, and the hysteresis exhibited by the switch may be adjustable. The period for which the pump runs at high speed may also be adjustable to suit a particular installation.

Operation of the control unit in the second embodiment is similar to that described above except that the pump cycles between running at a given speed below a predetermined level of vacuum, and being stopped above that level. Thus the given speed of the second embodiment is equivalent to the higher speed of the first embodiment, and the stopped pump of the second embodiment is equivalent to the lower speed of the first embodiment.

In one preferred embodiment the control unit 19 includes a timer 26 to ensure that the motor 18 runs at high speed for no longer than a maximum pre-set period, typically 90 seconds. This ensures that the pump has ample time to exhaust the brake servo in normal operating circumstances whilst avoiding damage caused by excessive running time at high speed. A vacuum leak or other malfunction may otherwise for example cause the pump to run continuously if the switch 21 does not change state on an increasing level of vacuum.

Should the motor be de-energised as a result of running for the maximum pre-set period, it is envisaged that a warning light 24 will indicate to the vehicle driver that the pump is unable to maintain the desired vacuum level. In all probability, the driver will be already aware of the loss of power assistance to the brakes, but in the event that he is not, the warning light may allow the driver time to prepare for the possibility of such loss.

It is envisaged that timer 26 would be re-set on switching the vehicle ignition off and on—this would allow the driver to repair a vacuum leak, by for example replacement of a hose, and continue his journey with full power assistance to the brakes.

In another preferred embodiment the temperature of the pump or pump motor is sensed by a temperature sensor 23 connected to the control means 19. The pump motor is de-energised on reaching a predetermined maximum temperature (typically 150° C.). Such a temperature could be an indication of pump or vacuum system malfunction and consequent imminent pump seizure. The maximum permissible temperature might also be reached as a result of the pump running for an extended period.

A warning light 25 could be provided to indicate to the vehicle driver that the pump was no longer functioning, or that pump de-energisation was imminent. In this latter case the pump would not be automatically de-energised on exceeding the maximum permitted running time; a warning light would be displayed but the pump would continue to run until de-energised on reaching the maximum permitted operational temperature. Temperature indication could be provided by any suitable means, typically a heat sensitive switching resistor or by bimetallic switch, and the predetermined maximum temperature could be adjustable to suit different operating environments.

Such a system is designed to ensure that the pump will fail safe under a number of different fault conditions. The system may also incorporate a time activated warning to alert the driver to prolonged high speed running of the pump, but in advance of pump de-energisation due to reaching the predetermined maximum temperature.

The system may also control the pump to run at more than two speeds, or to stop should vacuum demand cease entirely.

The control unit may include electronic apparatus of any known type to permit operating condition to the changed. For example it is envisaged that the timer, predetermined running period, excess temperature valve and control logic could all be changed electronically by a technician, or in response to a change in ambient conditions.

Figure 3:
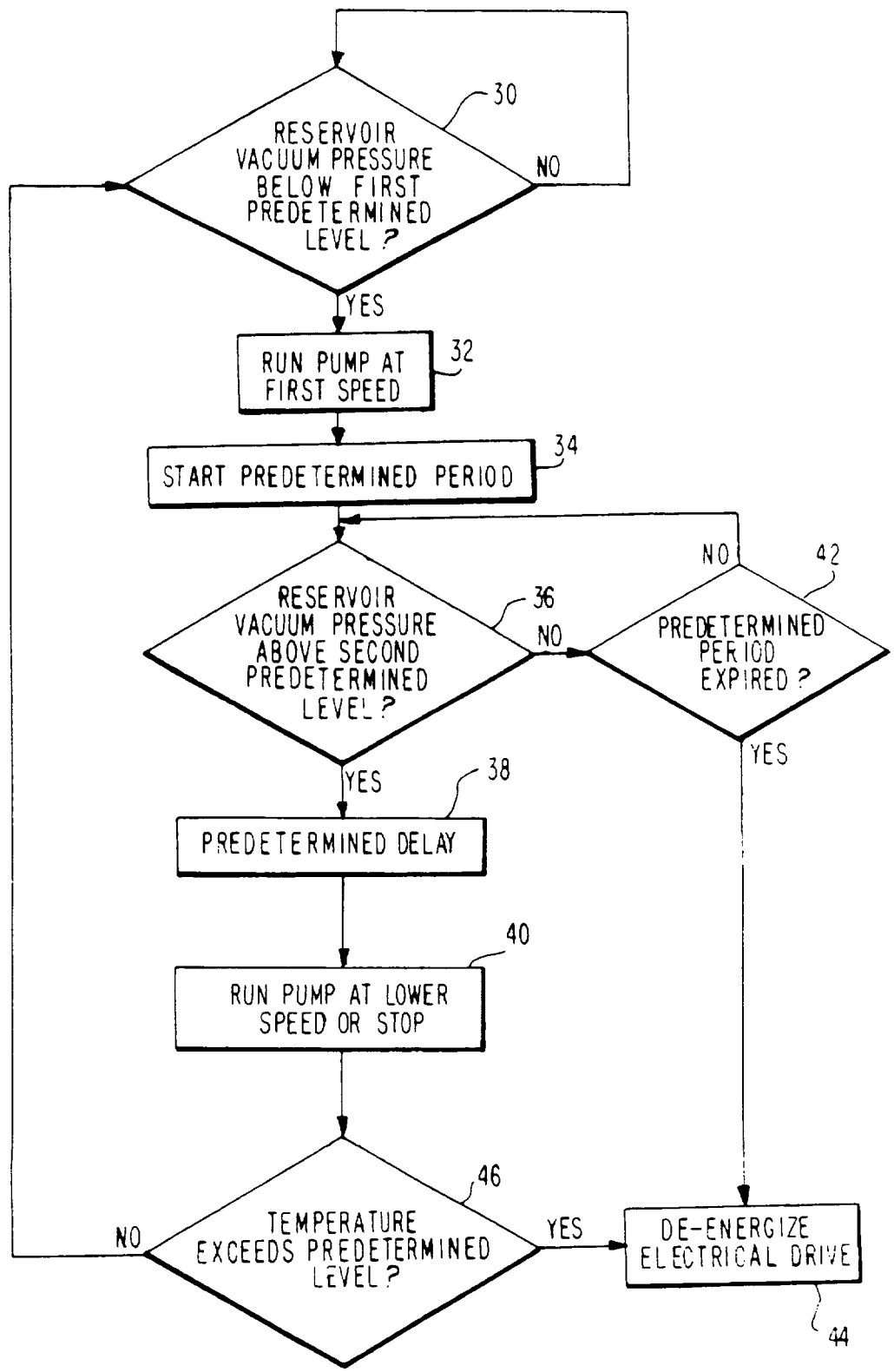
FIG. 3 is a flow diagram depicting a method of operation of the invention.

As shown in FIG. 3, a method of operating an electrically driven vacuum pump may be described. The method comprises the steps of causing the pump to run at a first speed in response to vacuum falling below a first predetermined level as shown in steps 30 and 32, and causing the pump to run at a lower speed or to stop in response to vacuum rising above a second predetermined level at a predetermined delay after the second predetermined level has been reached as shown in steps 36, 38 and 40, the first predetermined level being closer to atmospheric pressure than the second predetermined level.

The first and second predetermined levels are preferably separated by a small amount equivalent to the hysteresis in a pressure switch.

The method may also include the additional step of de-energising the electrical pump drive at a predetermined period after energisation thereof in the event that the level of vacuum has not risen to the second predetermined level as shown in steps 34, 36, 42 and 44.

The method may further include the step of de-energizing the electrical drive of the pump in the event that the temperature of the electrical drive and/or pump exceeds a predetermined level as shown in step 46.

It is understood that the sequence shown in FIG. 3 is merely illustrative and that the temperature and vacuum pressure levels may be monitored independently and continuously and not at discrete times.

I claim:

1. Vacuum pump control apparatus for an electrically driven vacuum pump (16, 18), the apparatus comprising a pressure switch (21) for indicating a predetermined level of vacuum in a reservoir (11), said switch (21) having two states, and control means (19) responsive to a first state of said switch (21) indicative of vacuum below said predetermined level to cause the electrical drive (18) of said pump (16) to run at a given speed, and responsive to a second state of said switch (21) indicative of vacuum above said predetermined level to cause said electrical drive (18) to run at a lower speed than said given speed, said control means further including delay means operable to delay slowing of said electrical drive (18) in response to said second state of said switch (21).

2. Apparatus according to claim 1 wherein said switch (21) has an hysteresis of approximately 5 kPa.

3. Apparatus according to claim 1 wherein said delay means provides a time delay in the range 2–5 seconds.

4. Apparatus according to claim 3 wherein said delay means provides a time delay in the range 3–4 seconds.

5. Apparatus according to claim 1 and further including timing means operable to de-energise said electrical drive (18) at a predetermined period after response to the first state of said switch (21), no further change of switch state having occurred during said predetermined period.

6. Apparatus according to claim 5 wherein said predetermined period is approximately 90 seconds.

7. Apparatus according to claim 1 and further including temperature monitoring means to sense temperature of said electrical drive (18) and/or pump (16), and operable to de-energise said electrical drive (18) at a predetermined temperature.

8. Apparatus according to claim 7 wherein said predetermined temperature is 150° C.

9. A method of operating an electrically driven vacuum pump to exhaust a reservoir the method comprising the steps of:

causing said pump to run at a first speed in response to vacuum falling below a first predetermined level in said reservoir, and causing said pump to run at a lower speed in response to vacuum rising above a second predetermined level in said reservoir at a predetermined delay after said second predetermined level has been reached, said first predetermined level being closer to atmospheric pressure than said second predetermined level.

10. The method of claim 9 further including the step of de-energising the electrical drive of said pump at a predetermined period after energisation to run at said first speed in the event that vacuum has not risen to said second predetermined level.

11. The method of claim 9 and further including the step of de-energising the electrical drive of said pump in the event that temperature of said electrical drive and/or pump exceeds a predetermined level.

* * * * *